United States Patent
Ohmi et al.

(10) Patent No.: US 6,606,912 B2
(45) Date of Patent: Aug. 19, 2003

(54) STRUCTURE OR CONSTRUCTION FOR MOUNTING A PRESSURE DETECTOR

(75) Inventors: Tadahiro Ohmi, 1-17-301, Komegahukuro 2-chome, Aoba-ku, Sendai-shi, Miyagi 980-0813 (JP); Takashi Hirose, Osaka (JP); Eiji Ideta, Osaka (JP); Nobukazu Ikeda, Osaka (JP); Ryousuke Dohi, Osaka (JP); Kouji Nishino, Osaka (JP); Kazuhiro Yoshikawa, Osaka (JP); Satoshi Kagatsume, Nirasaki (JP); Jun Hirose, Nirasaki (JP); Kazuo Fukasawa, Nirasaki (JP); Hiroshi Koizumi, Nirasaki (JP); Hideki Nagaoka, Nirasaki (JP)

(73) Assignees: Fujikin Incorporated (JP); Tadahiro Ohmi (JP); Tokyo Electron Ltd (JP)

( * ) Notice: Subject to any disclaimer, the term of this patent is extended or adjusted under 35 U.S.C. 154(b) by 120 days.

(21) Appl. No.: 09/825,340

(22) Filed: Apr. 4, 2001

(65) Prior Publication Data

US 2001/0035052 A1 Nov. 1, 2001

Related U.S. Application Data

(63) Continuation of application No. PCT/JP00/05235, filed on Aug. 3, 2000.

(30) Foreign Application Priority Data

Aug. 5, 1999 (JP) .......................................... 11-222367

(51) Int. Cl.$^7$ ................................................. G01L 7/00
(52) U.S. Cl. ..................................................... 73/756
(58) Field of Search ......................... 73/715, 716, 754, 73/756, 718; 148/286

(56) References Cited

U.S. PATENT DOCUMENTS

| | | | | |
|---|---|---|---|---|
| 6,076,409 A | * | 6/2000 | Bang | 73/756 |
| 6,092,783 A | * | 7/2000 | Scharnowski et al. | 251/129.07 |
| 6,116,092 A | * | 9/2000 | Ohmi et al. | 73/715 |
| 6,453,747 B1 | * | 9/2002 | Weise et al. | 73/715 |

* cited by examiner

Primary Examiner—Hezron Williams
Assistant Examiner—Marissa Ferguson
(74) Attorney, Agent, or Firm—Griffin & Szipl, P.C.

(57) ABSTRACT

A construction for mounting a pressure detector prevents the detector diaphragm from being strained by stress applied to the pressure detector as the detector is mounted in a fixture main body provided in a pipe line or the like, thereby keeping the output characteristics and temperature characteristics of the detector from greatly differing before and after the mounting. The pressure detector is constructed by combining and fastening together a diaphragm base having a diaphragm and a sensor base having a sensor element therein that is activated by displacement of the diaphragm base. The pressure detector, with a gasket placed thereunder, is disposed in a mounting hole of a fixture main body that is mounted in a pipe line. The pressure detector is air-tightly pressed and fastened by a presser member inserted from above in the mounting hole. The presser member is brought in contact with a block upper surface of the diaphragm base, and the gasket is also brought in contact with the block lower surface of the diaphragm base. A shallow groove is defined in the form of a ring on the lower surface of the block at a place inward of the portion contacting the metal gasket so that the shallow groove absorbs strain caused by the presser member.

6 Claims, 12 Drawing Sheets

STRUCTURE OR CONSTRUCTION FOR MOUNTING A PRESSURE DETECTOR

RELATED APPLICATIONS

This application is a continuation of PCT Application No. PCT/JP00/05235 filed on Aug. 3, 2000.

FIELD OF THE INVENTION

The present invention relates to improvements in and relating to a mounting structure or construction for mounting a pressure detector utilizing mainly a sensor chip as a pressure sensitive element.

BACKGROUND OF THE INVENTION

Diaphragm type pressure detectors utilizing a sensor chip as the pressure sensitive element or strain gauge have been widely used for the detection of fluid pressure in pipes.

FIGS. 10 and 11 illustrate diaphragm type pressure detectors as disclosed in the inventors' Japanese patent applications No. 10-82707 and 10-008841. The pressure detectors each comprise a sensor base 1 for supporting a pressure sensitive element in the form of a sensor chip 2, a diaphragm 3, a diaphragm base 4, a pressure transfer medium (silicone oil) 5, a seal ball 6, output lead pins 7, and a weld 8. If a fluid pressure 10 is applied to sensor chip 2 through diaphragm 3 and pressure transfer medium 5, voltage signals proportional to the pressure from a semiconductor pressure transducer forming the sensor chip 2 are produced at output lead pins 7.

FIGS. 12 and 13 show the pressure detectors of FIGS. 10 and 11, respectively, mounted to measure pressure in a pipeline or the like. FIG. 14 is an enlarged sectional view of a portion A of FIG. 13.

In FIG. 12, a fixture main body 11 has a fluid channel 11b therein, the channel extending from one side of the main body to an opposite side thereof. The main body 11 is mounted between pipe line end sections 52 so that fluid may flow between the end sections via channel 11b. A fluid passage 22 connects with channel 11b and permits pressure in the channel to be applied to diaphragm 3.

A presser member 12 rests on diaphragm base 4 and a bearing 14 rests on presser 12. A threaded clamping element such as a clamping bolt 15 is inserted into a threaded opening in the fixture main body 11 and, as the clamp is tightened, a force acting through bearing 14 and presser 12 pushes diaphragm 4 downward against a metal gasket 17.

In FIG. 13, clamping element 16 presses down on presser member 13 which in turn presses down on the sensor base 1 so that diaphragm 4 is pressed against metal gasket 17.

In both FIGS. 12 and 13, the pressure applied by the presser member 12, 13 creates an air-tight seal, via the metal gasket 17, between the diaphragm 4 and the fixture main body 11. The metal gasket 17 is made of a material that has a high resistance to corrosion and wear, and does not generate dust.

Diaphragm type pressure detectors constructed as shown in FIGS. 10 and 11 can minimize the so-called dead space when mounted on a pipe line or the like. This offers practical advantages in that the gas exchangeability is high and a desired passive state film without spots, and with a uniform thickness, can be formed with relative ease on the gas-contact surface of the diaphragm 3.

The metal gasket 17, being made of a material having a high resistance to corrosion and not prone to generating dust, is almost free from O-ring corrosion-caused problems, unlike the mountings of diaphragm type pressure detectors using an O-ring. However, other problems exist, the most serious problem being fluctuations in measurements attributable to stress, strain or the like on the diaphragm 3.

Diaphragm 3 is very thin, on the order of 0.05 to 0.06 mm. The diaphragm thickness is reduced to raise the pressure detection sensitivity. In such a state as shown in FIG. 12, therefore, stress or strain on the diaphragm 3 inevitably results at the time of tightening clamping bolt 15 when the contact surface of metal gasket 17 is brought into contact with the block lower surface 4f (FIG. 10) of the diaphragm base 4. This changes greatly the stress applied to the sensor chip 2 through silicone oil 5.

Experiments were conducted using a pressure detector with a diaphragm 0.05–0.06 mm thick, about 10 mm in inside diameter, and having a detection pressure range from several Torr to 7 kgf/cm$^2$ abs. The pressure P acting on the diaphragm 3 was high at some Ps=7 kgf/cm$^2$ abs, and the pressure detector was mounted on the fixture main body 11. The output Vs (mv) and temperature characteristics ZTC (% FS/° C.) were not much different from those observed when the pressure detector was in a free state, that is, not mounted on the fixture main body 11.

However, in the case where the pressure P applied to the diaphragm 3 was low, for example, Po=0 kfg/cm$^2$ abs, the output Vo changed by more than 5.2 mv when the pressure detector was mounted. (The output was 16.66 mv before the mounting of the pressure detector and 21.86 mv after the mounting.) The temperature characteristics ZTC (% FS/° C.), too, greatly fluctuated from 0.162 to 0.719. That is, as far as the output is concerned, differences in measurements are too large. In respect of temperature characteristics, too, fluctuations are too large to compensate. Thus, this pressure detector presents problems when used in practice.

On the other hand, if the peripheral portion of the diaphragm base 4 is formed as shown in FIG. 11, and if the pressure detector is tightened and clamped with the outer circumferential surface 4d of the block of the diaphragm base 4, and the inner circumferential surface 17d of the gasket 17 not in contact with each other (FIG. 14), the magnitude of change ΔVo in output before and after the mounting under pressure Po=0 kgf/cm$^2$ abs can be reduced to less than ± about 3.5 mv. Likewise, the temperature characteristics ZTC (% FS/° C.) will come within a range between 0.052 and 0.259. If the pressure detector is mounted on a pipe line etc., the characteristics will be well applicable in practice through a specific correction procedure.

In the mounting construction shown in FIGS. 13 and 14, the magnitude of the change ΔVo in output before and after mounting of the sensor will be small. This is because the gasket 17 is placed between the collar lower surface 4c of a collar 4a provided on the diaphragm base 4 and the outer circumferential surface 4d of the thick (about 2 mm) block 4b of the diaphragm base 4, and further because the inner circumferential surface 17d of the metal gasket 17 and the outer circumferential surface 4d of the block 4b are not in contact with each other. Therefore, even if the presser member 13 applies downward pressure on the metal gasket 17 through the sensor base 1 and diaphragm base 4, the upward and downward reaction forces of the metal gasket 17 are all received by the collar 4a of the diaphragm base 4. In other words, almost no strain or stress, resulting from tightening, acts on the diaphragm 3 formed integrally in the block 4b of the diaphragm base 4.

However, it is desirable that the change ΔVo in output before and after the mounting of the pressure detector and the temperature characteristic ZTC (%FS/° C.), be as small as possible. With the prior art construction or mounting structure shown in FIG. 14, the trouble is that the magnitude of ΔVo is still too large.

SUMMARY OF THE INVENTION

The main object of the present invention is to solve the above-mentioned problem encountered when the diaphragm type pressure detector having the constitution shown in FIGS. 10 to 14 is actually applied to the pipe line or the like. That is, an object of the invention is to solve the problem of lowered measurement precision, resulting from large changes in output and temperature characteristics caused by differences in stress or strain on the diaphragm, that arise when the pressure detector is mounted in the fixture main body. This object is achieved by improvements in the structure or construction for mounting the pressure detector on the pressure detector fixture main body so that (1) when the pressure detector is fixed in the fixture main body the output and temperature characteristics will be hardly different from those observed when the pressure detector is not mounted, and (2) the pressure detector can be applied to the pipe line etc. without increasing the dead space in the fluid passage.

An object of the invention is to provide a structure or construction for mounting a pressure detector, the pressure detector comprising a diaphragm base provided with a diaphragm and a sensor base fixed to the diaphragm base and having a built-in sensor element that is activated with displacement of the diaphragm base, the pressure detector being inserted in a mounting hole of a fixture main body mounted in a pipe line with a gasket placed under the pressure detector, the pressure detector being pressed and fixed in an air-tight manner in the mounting hole by a presser member inserted in the mounting hole from above, wherein the presser member is brought in contact with a block upper surface 4e of the diaphragm base 4 and the gasket 17 is brought in contact with a block lower surface 4f of the diaphragm base, and a shallow groove 18b in the form of a ring is defined on the block lower surface 4f at a place inward of the portion contacting the metal gasket 17 so that the strain arising from pressing by the presser member 12 is absorbed by the shallow groove 18b.

Another object of the invention is to provide a structure or construction for mounting a pressure detector, the pressure detector comprising a diaphragm base provided with a diaphragm and a sensor base fixed to the diaphragm base and having a built-in sensor element that is activated with displacement of the diaphragm base, the pressure detector being inserted in a mounting hole of a fixture main body mounted in a pipe line with a gasket placed under the pressure detector, the pressure detector being pressed and fixed in an air-tight manner in the mounting hole by a presser member inserted in the mounting hole from above, wherein the presser member is brought in contact with a block upper surface 4e of the diaphragm base 4 and the gasket 17 is brought in contact with a block lower surface 4f of the diaphragm base, a shallow groove 18a in the form of a ring is defined in the block upper surface 4e at a place inward of a portion contacting the presser member 12, and a shallow groove 18b in the form of a ring is defined on the block lower surface 4f at a place inward of the portion contacting the metal gasket 17 so that the strain arising from pressing by the presser member 12 is absorbed by the shallow groove 18b A further object of the invention is to provide a structure or construction for mounting a pressure detector, the pressure detector comprising a diaphragm base provided with a diaphragm and a sensor base fixed to the diaphragm base and having a built-in sensor element that is activated with displacement of the diaphragm base, the pressure detector being inserted in a mounting hole of a fixture main body mounted in a pipe line with a gasket placed under the pressure detector, the pressure detector being pressed and fixed in an air-tight manner in the mounting hole by a presser member inserted in the mounting hole from above, wherein a first step portion 19 and a second step portion 20 are provided in a lower portion of the mounting hole 11a of the fixture main body 11, with the area between a horizontal plane 20b of the second step portion 20 and the lower contacting surface 17b of the gasket 17 serving as a seal portion, a collar 1a being provided on the sensor base 1 of the pressure detector and a collar 4a provided in an upper portion of the diaphragm base 4, the two collars being placed opposite to each other and fixed, in addition, a seal portion between the collar lower surface 4c of the collar 4a of the diaphragm base 4 and the upper contacting surface 17a of the metal gasket 17, and a shallow groove 18c being defined at an inward portion of the collar upper surface 1b of the sensor base 1 and a shallow groove 18d being defined at an inward portion of the collar lower surface 4c of the diaphragm base 4, both in a ring form, the metal gasket 17 having an almost rectangular section and an upper contact face 17a and a low contact surface 17b so strain arising from pressing the collar upper surface 1b of the sensor base 1 by the presser member 13 is absorbed by the shallow grooves 18c, 18b.

A further object of the invention is to provide a structure or construction for mounting a pressure detector, the pressure detector comprising a diaphragm base provided with a diaphragm and a sensor base fixed to the diaphragm base and having a built-in sensor element that is activated with displacement of the diaphragm base, the pressure detector being inserted in a mounting hole of a fixture main body mounted in a pipe line with a gasket placed under the pressure detector, the pressure detector being pressed and fixed in an air-tight manner in the mounting hole by a presser member inserted in the mounting hole from above, wherein a first step portion 19 and a second step portion 20 are provided in a lower portion of the mounting hole 11a of the fixture main body 11, with the area between a horizontal plane 20b of the second step portion 20 and the lower contacting surface 17b of the gasket 17 serving as a seal portion, a collar 1a being provided on the sensor base 1 of the pressure detector, the collar 1a and an upper surface 4e of the diaphragm base 4 being positioned opposite of each other and fastened, the diaphragm base 4 protruding downward from a diaphragm base block lower surface 4f to form a seal surface 4g with an area between the seal surface 4g and the upper contact face 17a of the metal gasket 17 serving as a seal portion, a shallow groove 18e being defined at an inward portion of the collar upper surface 1b of the collar 1a of the sensor base 1, a shallow groove 18f being defined at an inward portion of the block lower surface 4f of the diaphragm base 4, and shallow grooves 18g, 18h defined opposite to each other at a position upward of the seal surface 4g protruding downward, each in the form of a ring, the metal gasket 17 having an almost rectangular section with an upper contact face 17a and a low contact surface 17b so strain arising from pressing on the collar upper surface 1b of the sensor base 1 by the presser member 13 is absorbed by the shallow grooves 18e, 18f, 18g, 18h.

Another object of the invention is to provide a pressure sensor mounting construction as described above wherein an outer circumferential portion 24 of the collar 1a of the sensor base 1 and an outer circumferential portion 25 of the block 4b are made of a material with a high hardness.

DESCRIPTION OF THE PREFERRED EMBODIMENTS

In the following description, the same reference numbers are used to refer to the same elements as in FIGS. 10 to 14.
Embodiment 1

Figure 1:
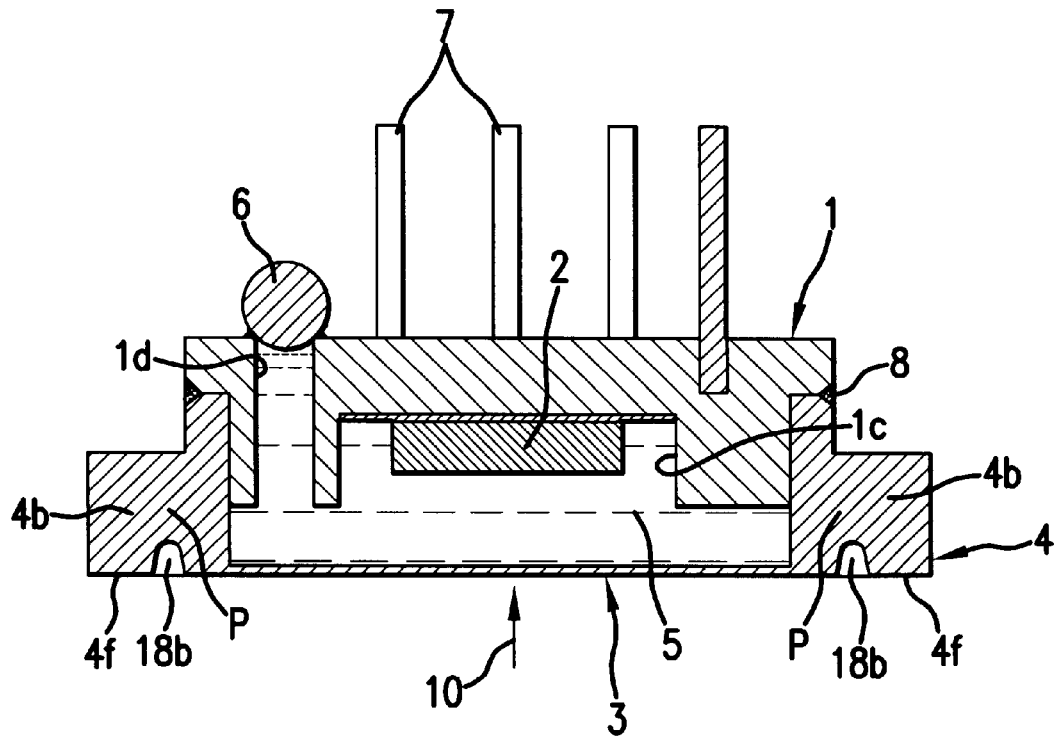
FIG. 1 is a schematic section view of a pressure detector according to a first embodiment of the present invention.

In FIG. 1, a pressure detector according to the first embodiment of the present invention comprises a sensor base 1, a sensor chip 2, a diaphragm 3, a diaphragm base 4, a pressure transfer medium 5, the sensor lead pins 7 and a weld 8.

The sensor base 1 is made of stainless steel in the form of a thick disk, with a chip housing 1c formed in the center of the underside and an oil inlet hole 1d and lead pin through holes (not shown) provided therein.

The sensor chip or pressure sensitive element is a known diffusion-type semiconductor pressure transducer. That is, the sensor chip 2 has a diaphragm construction that deforms when pressure is received. The chip includes four resistors formed by the same manufacturing method as integrated circuits, the resistors being connected in the form of a bridge. The resistance across the bridge varies as the resistors are subjected pressure changes so that a voltage output signal proportional to the degree of applied pressure is produced at the output terminals of the bridge.

The diaphragm 3 and diaphragm base 4 are formed integrally in one piece of stainless steel about 50 µm in thickness and about 10 mm in inside diameter. The thickness of the diaphragm 3 can be changed depending on the detection pressure range of the detector. For a pressure detector for measurement of absolute pressure values from several torr to 7 kgf/cm$^2$ according to the present embodiment, the diaphragm may be 10 mm in diameter and preferably about 50 µm thick.

The diaphragm 3 and the diaphragm base 4 may be formed separately and welded together.

It is also noted that the diaphragm 3 has a so-called passive state film formed on its gas-contact surface by a known technique. Formed on the outside surface layer of the gas contact surface is a passive state film about 200 Å thick of about 100% of chromium oxide or a fluoride passive state film some 1,000 to 3,000 Å thick or an oxide passive state film some 200 Å thick of a mixture mainly of aluminum oxide and chromium oxide.

The pressure transfer medium 5 transfers to the sensor chip 2 the pressure 10 applied to the diaphragm 3. Silicone oil is used as the pressure transfer medium because it has a low temperature expansion coefficient and compressibility coefficient and is chemically stable.

A seal ball 6, made of ball-bearing steel, is used to seal an oil inlet hole 1d through which the silicone oil 5 is entered into the pressure detector.

The construction of the diaphragm type pressure detector itself is known and will not be described in detail.

In the diaphragm type pressure detector according to the first embodiment, a shallow groove 18b to release strain is formed in the shape of a ring on the lower surface 4f of the peripheral flange or block 4b of the diaphragm base 4 as shown in FIG. 1. Shallow groove 18b is provided in the form of a ring at a place radially inward of the portion contacting the metal gasket 17. See FIG. 3. The groove is V-shaped (or reverse U-shaped) or U-shaped (reverse V-shaped). The depth of the groove may be about 0.3 to 0.5 mm for a diaphragm base 4 having a thickness of 1.5 to 2.5 mm.

The shape and effects of the shallow groove 18b are the same as in the second embodiment described below.
Embodiment 2

Figure 2:
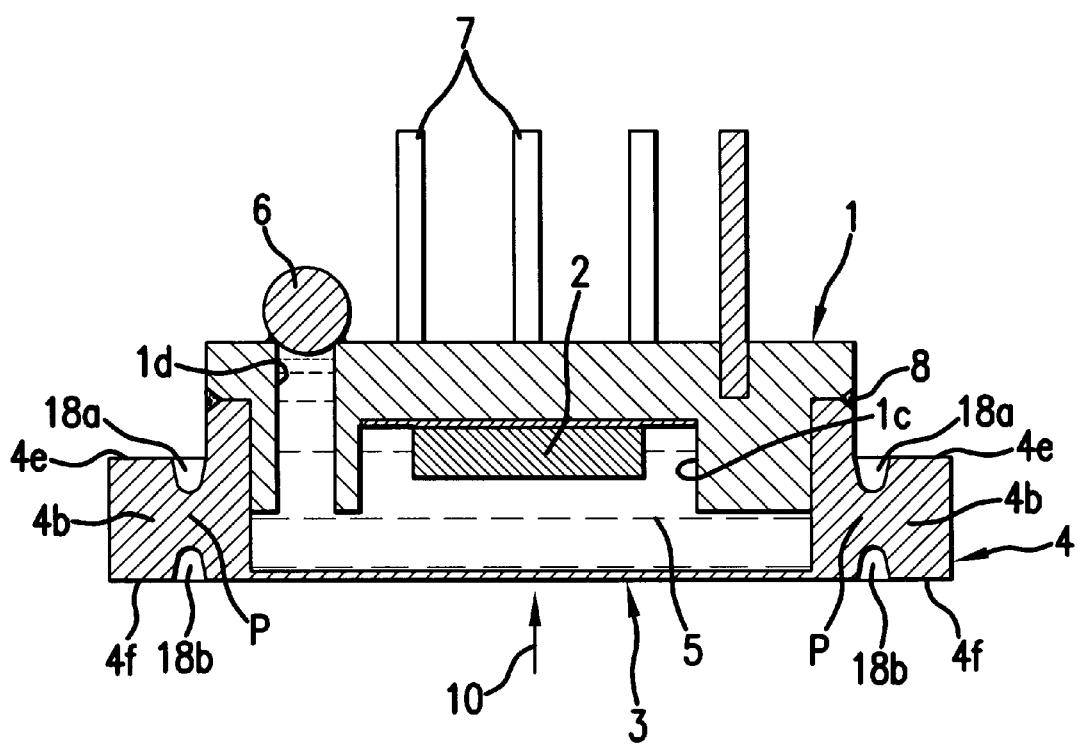
FIG. 2 is a schematic section view of a pressure detector according to a second embodiment of the present invention.
Figure 3:
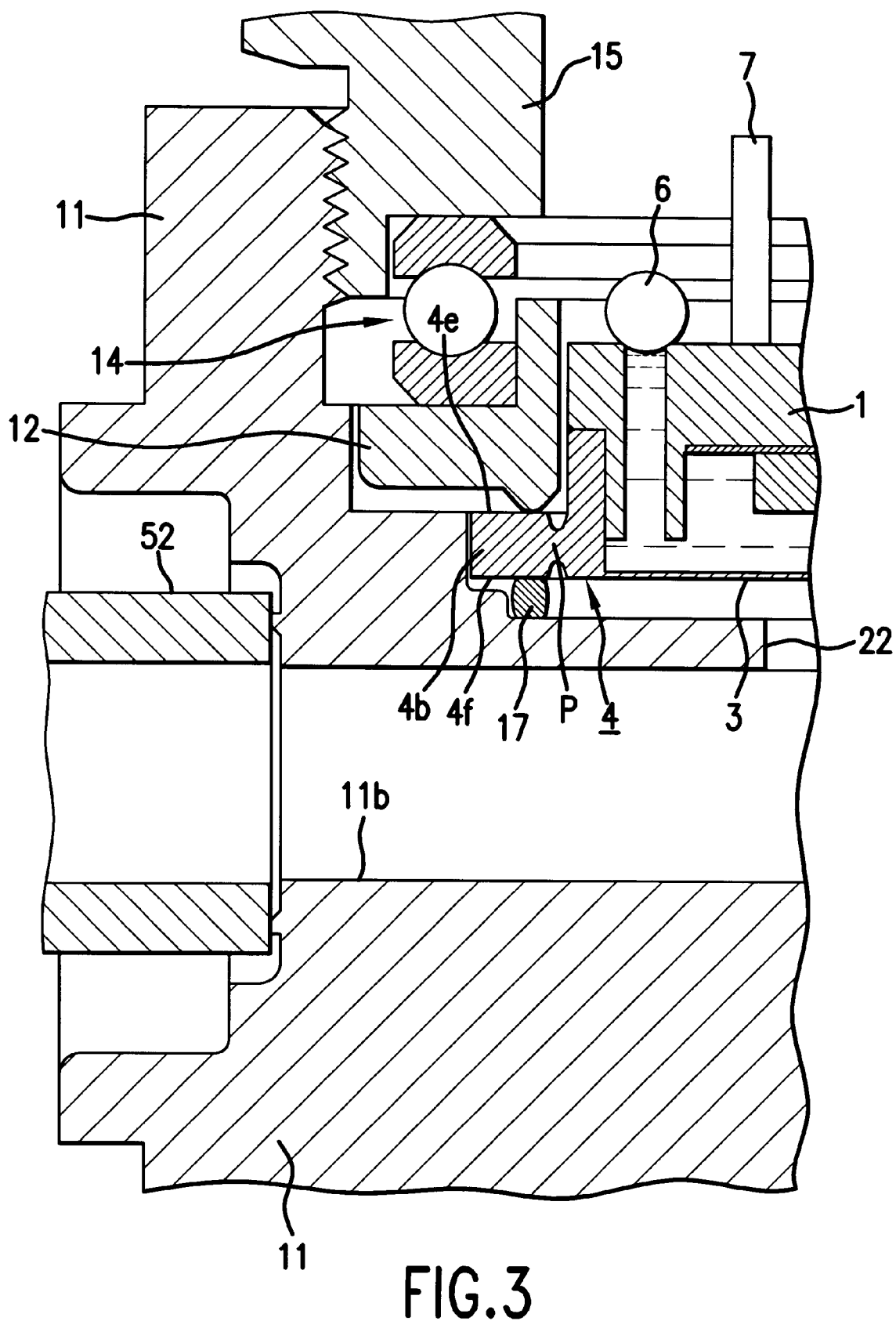
FIG. 3 is a partially enlarged sectional view showing the mounting construction of the pressure detector according to the second embodiment.

FIG. 2 is a schematic section view of a pressure detector according to the second embodiment of the present invention, and FIG. 3 is a partially enlarged sectional view showing the mounting construction of the pressure detector according to the second embodiment. The pressure detector according to the second embodiment is essentially identical with the pressure detector according to the first embodiment except that another shallow groove 18a is provided. In other words, the pressure detector according to the second embodiment has so-called strain-releasing shallow grooves 18a and 18b formed in the shape of rings, the former being in the upper surface 4e of the block 4b of the diaphragm base 4 and the latter on the lower surface 4f. The embodiment shown in FIG. 3 thus differs from the pressure detector according to the first embodiment only in that it includes the shallow groove 18a.

FIG. 3 shows the pressure detector of FIG. 2 mounted in a fixture main body 11, the main body having a fluid flow channel 11b. It will be understood that fixture main body 11 is mounted in or on a pipe line or machine part 52 so that pressure of a fluid in the pipe or machine part is communicated through channel 52 and a fluid passage 22 to the diaphragm 3.

In FIG. 3, as the clamp 15 is tightened into fixture main body 11, upward and downward compressive forces (upward and downward reaction forces) are applied to the block 4b outside the grooves 18a and 18b via the presser member 12 and the metal gasket 17. If, at the time of tightening the clamp 15, a strain force is applied to the diaphragm 3 by upward and downward compressive forces acting on the block 4b (if, for example, component forces of the upward and downward compressive forces arise and act on the diaphragm 3), deformation by strain force is absorbed near the thin part P between the shallow grooves 18a, 18b (second embodiment) or 18b (first embodiment) provided opposite to each other on the block upper surface 4e and block lower surface 4f, respectively, of the diaphragm base 4. As a result, the strain force is kept from reaching the diaphragm 3 directly. Thus mounting of the pressure detector in the fixture main body 11 causes no strain on diaphragm 3.

Embodiment 3

Figure 4:
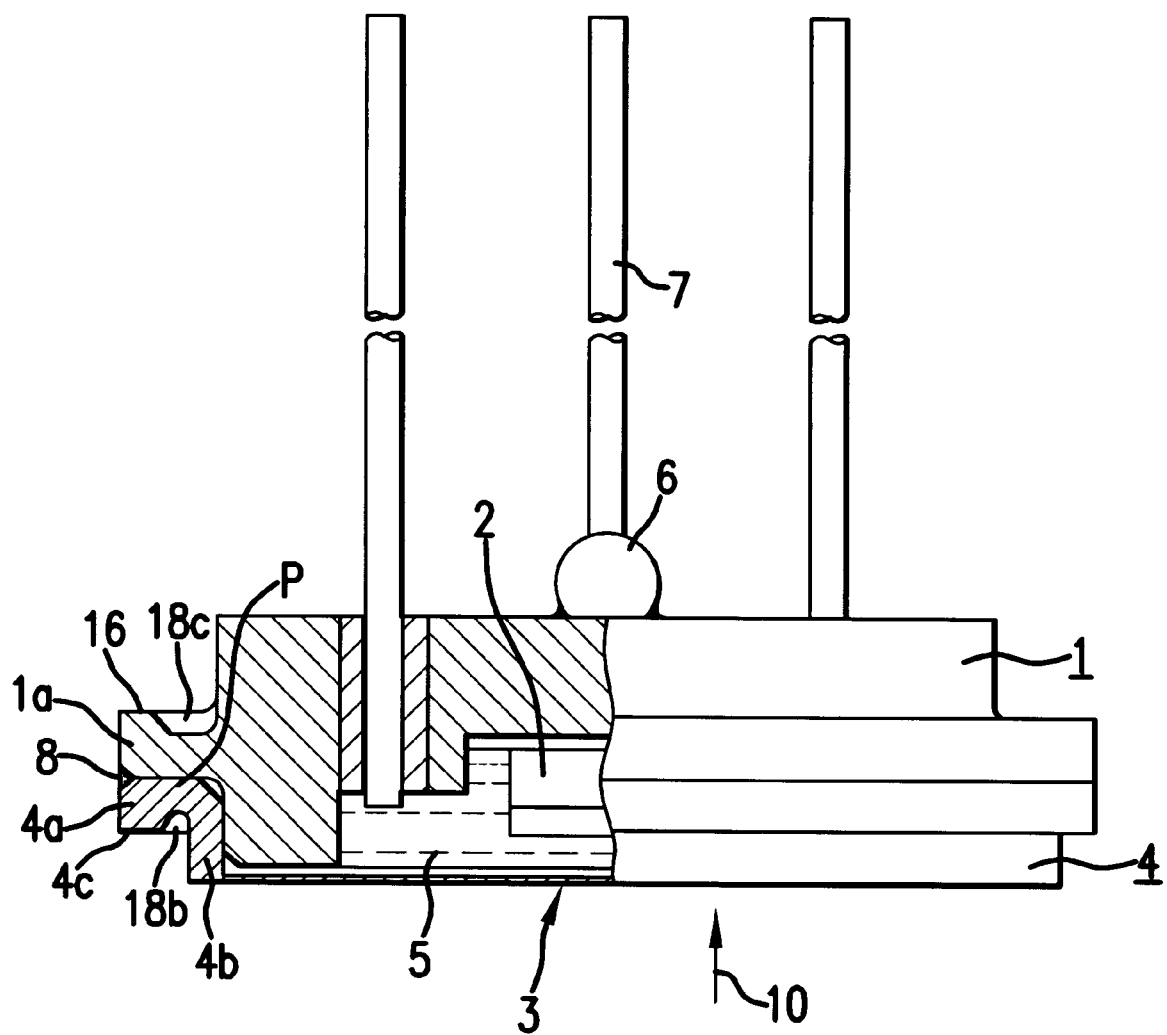
FIG. 4 is a schematic section view of a pressure detector according to a third embodiment of the invention.
Figure 5:
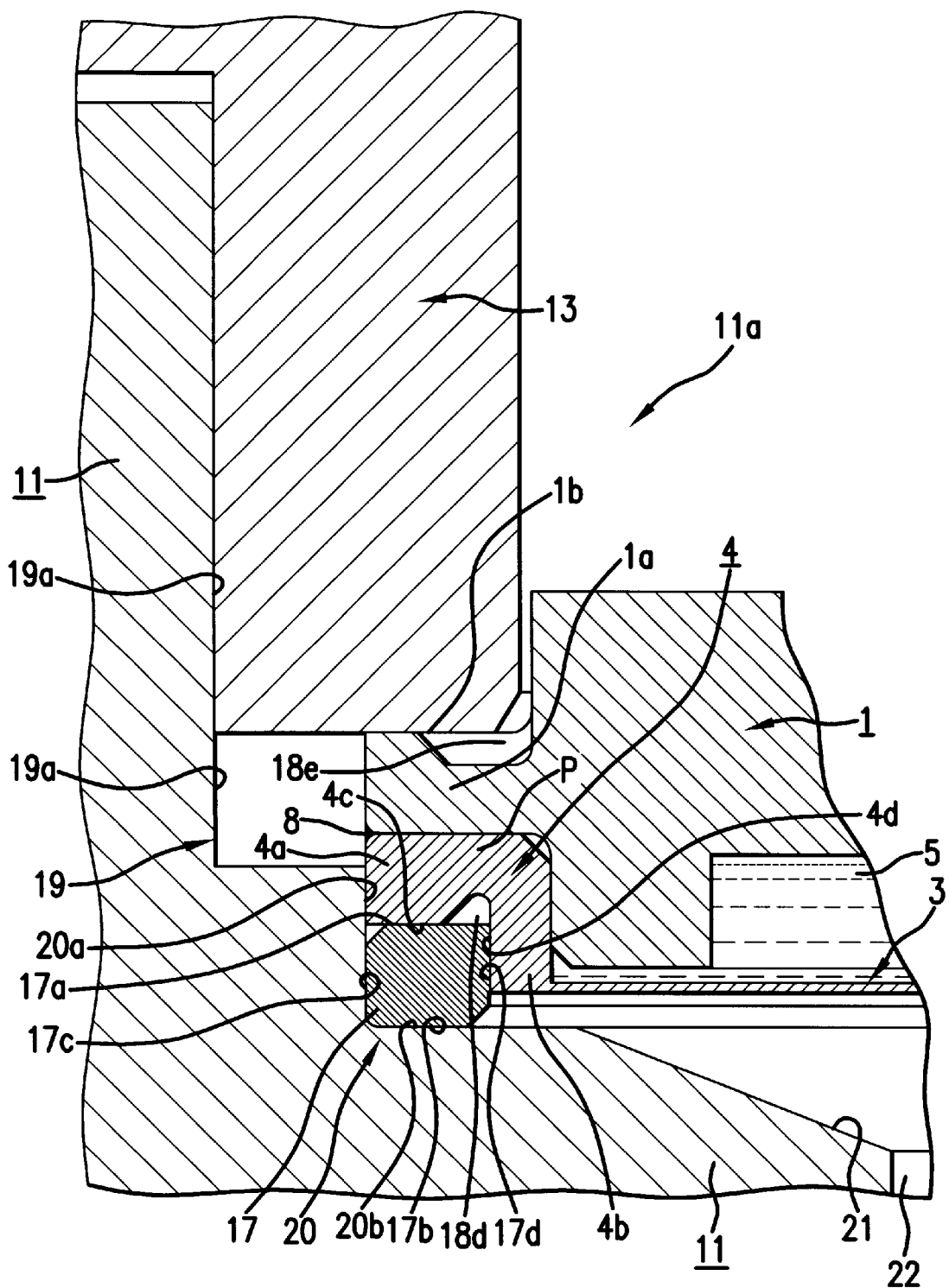
FIG. 5 is a partially enlarged sectional view showing the mounting construction of the pressure detector according to the third embodiment.

FIG. 4 is a schematic section view of a pressure detector according to a third embodiment of the invention, and FIG. 5 is a partially enlarged sectional view showing the mounting construction of the pressure detector.

In the third embodiment, a collar 1a and a collar 4a formed in the sensor base 1 and the diaphragm base 4, respectively. The two collars 1a, 4a are positioned opposite each other and united by a weld 8 on their outer circumferential portion.

The diaphragm base 4 is formed of a ring-shaped block 4b and collar or flange 4a. The lower surface 4c of the collar 4a is a seal surface that comes in contact with the upper contact face 17a of the gasket 17 as shown in FIG. 5. Therefore, the lower surface 4c of the collar 4a is finished to a high-precision smooth surface.

In the third embodiment the diaphragm base 4 may have a diameter of 13 mm with the diameter of the diaphragm pressure-receiving surface being 11 mm and the thickness of the diaphragm 3 about 0.06 mm. The passive state film is about 200 Å of chromium oxide, the total thickness of the diaphragm base 4 is 4 mm and lead pins 7 are metal pieces of which one is an earth electrode. To an input circuit (not shown), a 1.5 mA d.c. current is applied. As the pressure applied on the sensor element of sensor chip 2 changes, four resistors formed of sensor chips change in resistance, so that an output voltage V is developed between the output terminals.

In the pressure detector according to the third embodiment, a shallow groove 18c is formed on the collar upper surface 1b of the sensor base 1 at an inward portion thereof, and a shallow groove 18d is formed on the collar lower surface 4c of the diaphragm base 4 at an inward portion thereof. The shallow groove 18c is dish-shaped in section, while the shallow groove 18d is reverse U-shaped (or reverse V-shaped).

In the third embodiment, a metal gasket 17 and the pressure detector are inserted in a cylindrical mounting hole 11a formed in the upper center of fixture main body 11 as shown in FIG. 5. Fixture main body 11 is made of stainless steel. With the collar upper surface 1b of the sensor base 1 pressed by a clamp (not shown) via the presser member 13, the pressure detector is mounted airtight via the metal gasket 17. The mounting hole 11a is reduced in size at its bottom portion by fixture main body 11 defining a first step portion 19 and a second step portion 20. The circumferential wall surface 19a of the first step portion 19 is a guide surface for the presser member 13. The circumferential wall surface 20a of the second step portion 20 is in contact with the lower face 17b of the gasket 17. The circumferential wall surface 20a and the horizontal plane 20b define the fitting portion receiving the gasket 17.

The inside portion of the horizontal plane 20b of the second step portion 20 is formed in a taper 21. In the center of the bottom of the mounting hole 11a, a fluid passage 22 is provided.

The gasket 17 is ring-shaped and the section of the gasket is rectangular with the width being longer than the height and with the four corners of the rectangle chamfered.

The inner circumferential surface 17d of the gasket 17 and the outer circumferential surface 4d of the block 4b of the diaphragm base 4 are not in contact with each other. The upper contact face 17a of the gasket 17 is in contact with the lower surface 4c of the collar 4a of the diaphragm base 4. Furthermore, the outer circumferential surface 17c of the gasket 17 is in contact with the circumferential wall surface 20a of the second step portion 20. That is, the collar lower surface 4c of the diaphragm base 4, the circumferential wall surface 20a of the second step portion 20 and the horizontal plane 20b form a fitting portion receiving the gasket 17. The distance between the circumferential wall surface 20a and the outer circumferential surface 4d of the collar main body is set at about the same as or a little longer than the width of the gasket 17.

In FIG. 5, the gasket 17 is 14.7 mm in outside diameter, 13.0 mm in inside diameter, 1.5 mm in width of the seat, 0.9 mm in thickness of the seat (height), and 0.8 mm in width of the contact faces 17a, 17b of the seat. The gasket is made of stainless steel under the JIS designation SUS 316L-P (w melt).

The effects of the aforesaid shallow grooves 18c, 18d are the same as in the second embodiment shown in FIG. 3. That is, the strain force caused by upward and downward compressive forces (reaction forces) applied through the presser member 13 is absorbed by the grooves 18c, 18d and the thin thickness part P between the grooves, whereby the strain force is kept from directly reaching the diaphragm 3.

Embodiment 4

Figure 6:
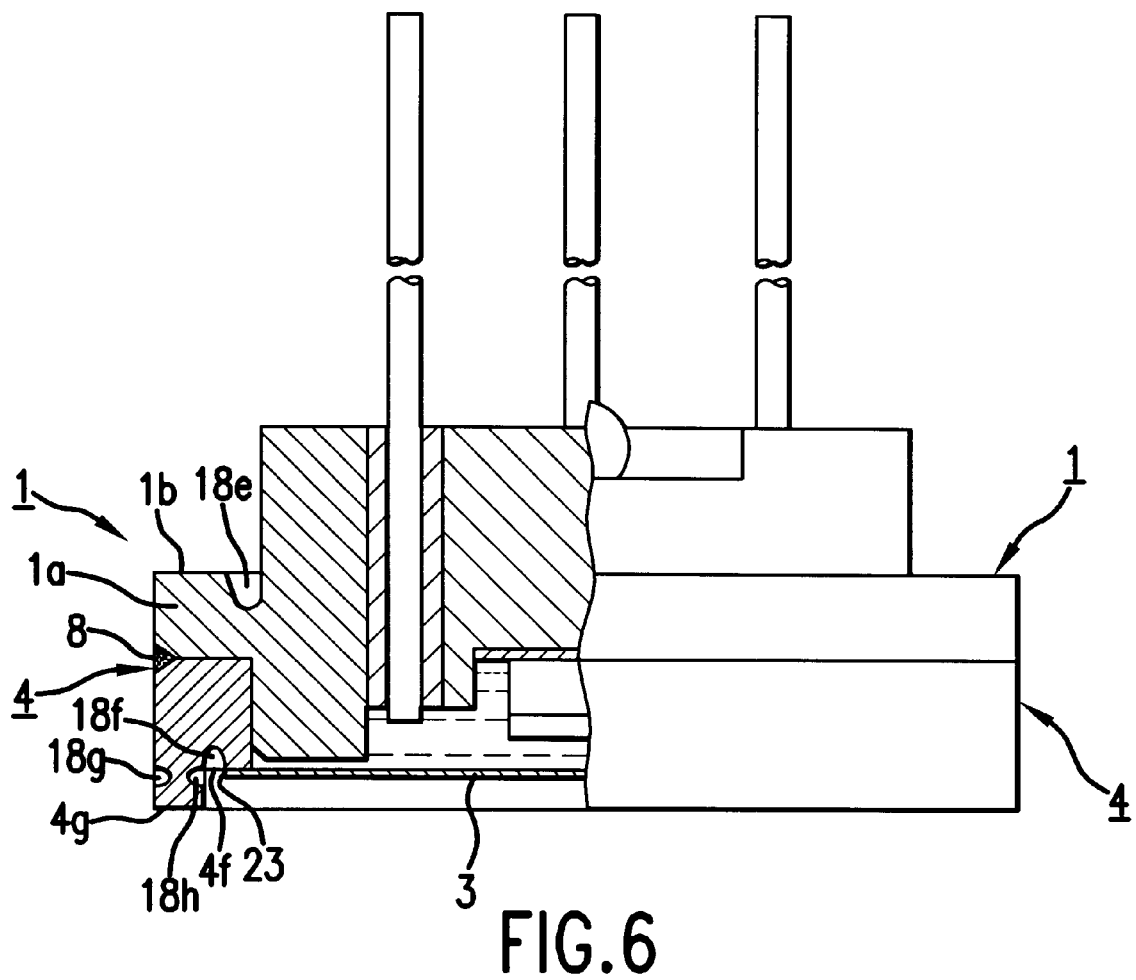
FIG. 6 is a schematic section view of a pressure detector according to a fourth embodiment of the invention.
Figure 7:
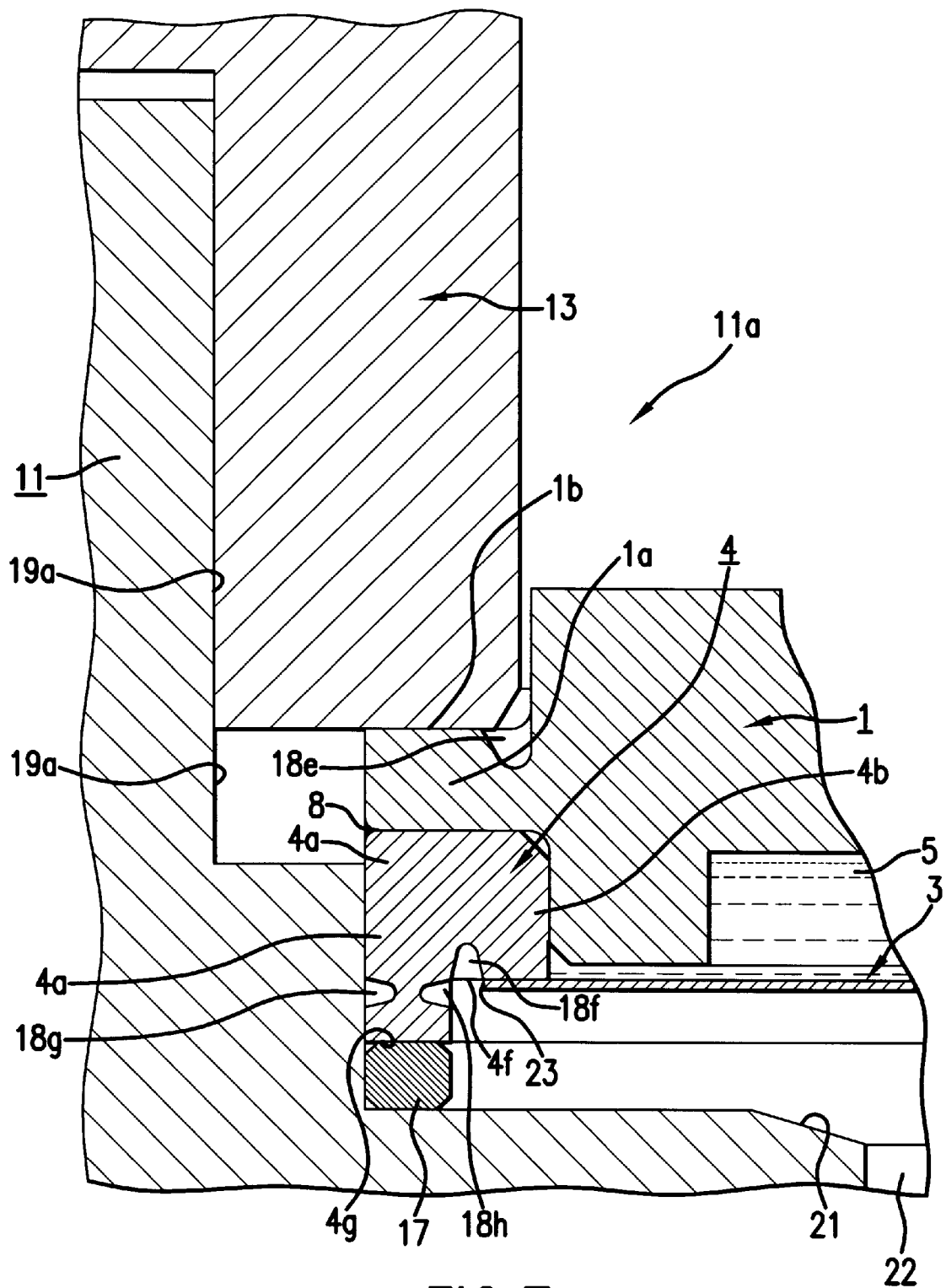
FIG. 7 is a partially enlarged sectional view showing the mounting construction of the pressure detector according to the fourth embodiment.

FIG. 6 is a schematic section view of a pressure detector according to the fourth embodiment of the present invention, and FIG. 7 is a partially enlarged sectional view showing the mounting construction of the pressure detector.

In the fourth embodiment, the diaphragm 3 and the diaphragm base 4 are formed separately and united to each other by providing a weld 23.

A seal surface 4g is formed on the lower surface side of the diaphragm base 4 in such a way that the seal surface protrudes from the diaphragm 3 to a downward position. That is, the seal surface 4g extends below the lower surface 4f of the diaphragm base 4. Shallow grooves 18g, 18h with a U-shaped (or V-shaped) section are formed symmetrically above the surface 4g at a position almost as high as the diaphragm.

Shallow grooves 18e, 18f are formed at an inward position of the collar upper surface 1b of the sensor base 1 and in the central position of the block lower surface 4f of the diaphragm base 4, respectively.

The grooves 18e, 18f absorb the strain force caused by the upward and downward pressure forces applied to the diaphragm base 4 via the presser member 13, thereby reducing the effects of the strain force that directly acts on the diaphragm 3 when a clamp 16 (see FIG. 13) is tightened up.

Embodiment 5

Figure 8:
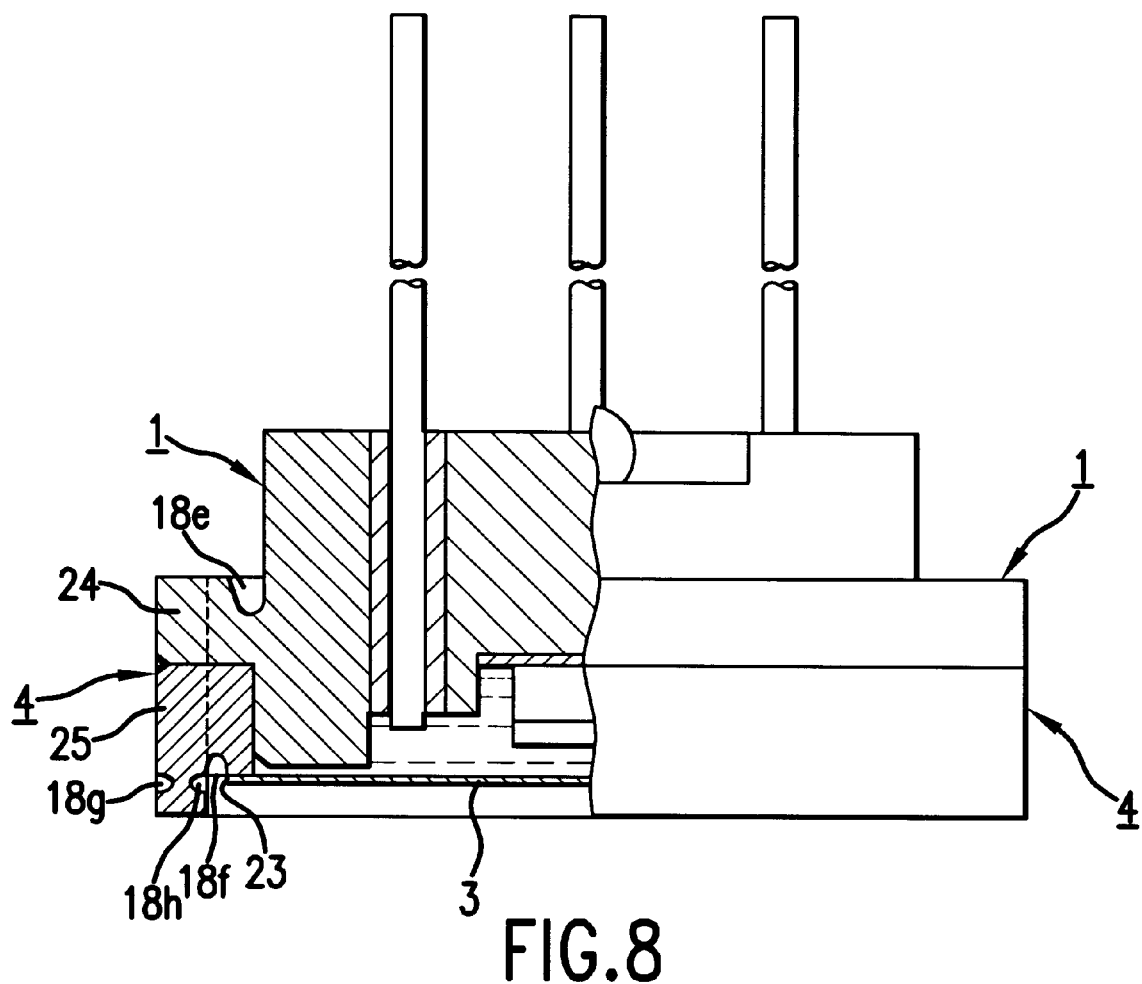
FIG. 8 is a schematic section view of a pressure detector according to a fifth embodiment.
Figure 9:
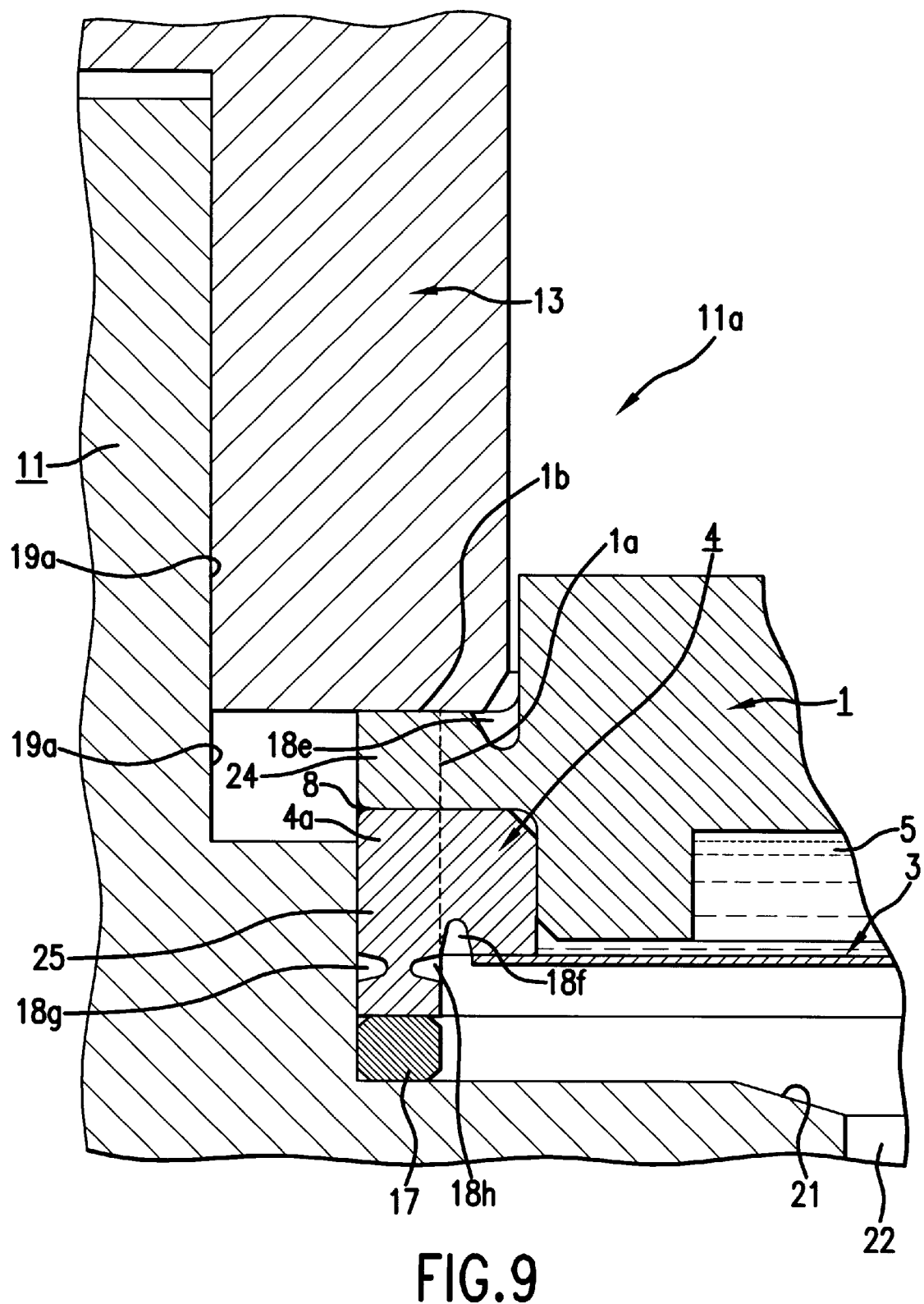
FIG. 9 is a partially enlarged sectional view showing the mounting construction of the pressure detector according to the fifth embodiment
Figure 10:
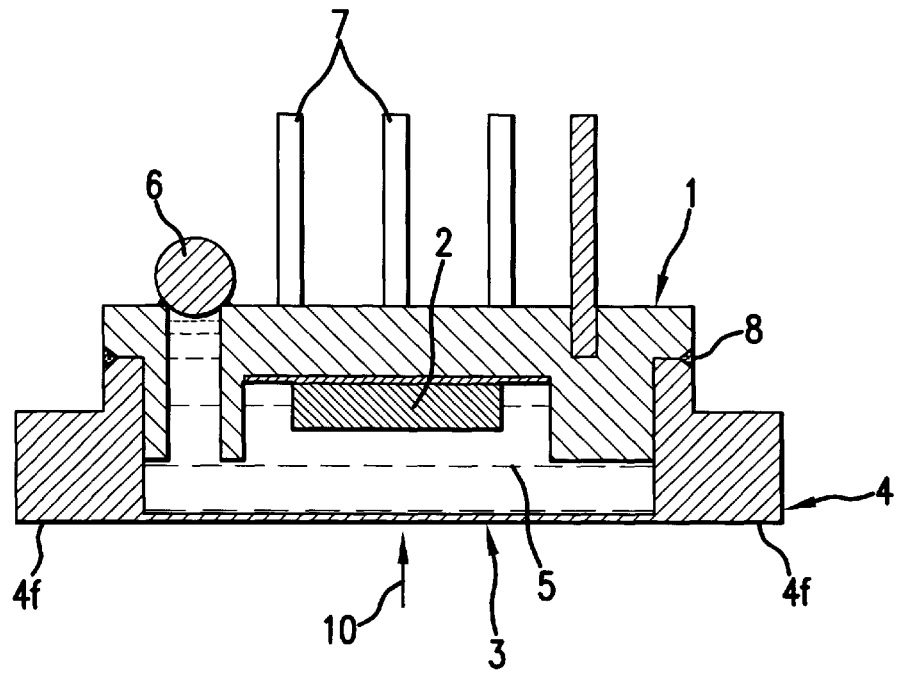
FIG. 10 is a vertical, sectional view showing an example of construction of a prior art pressure detector.
Figure 11:
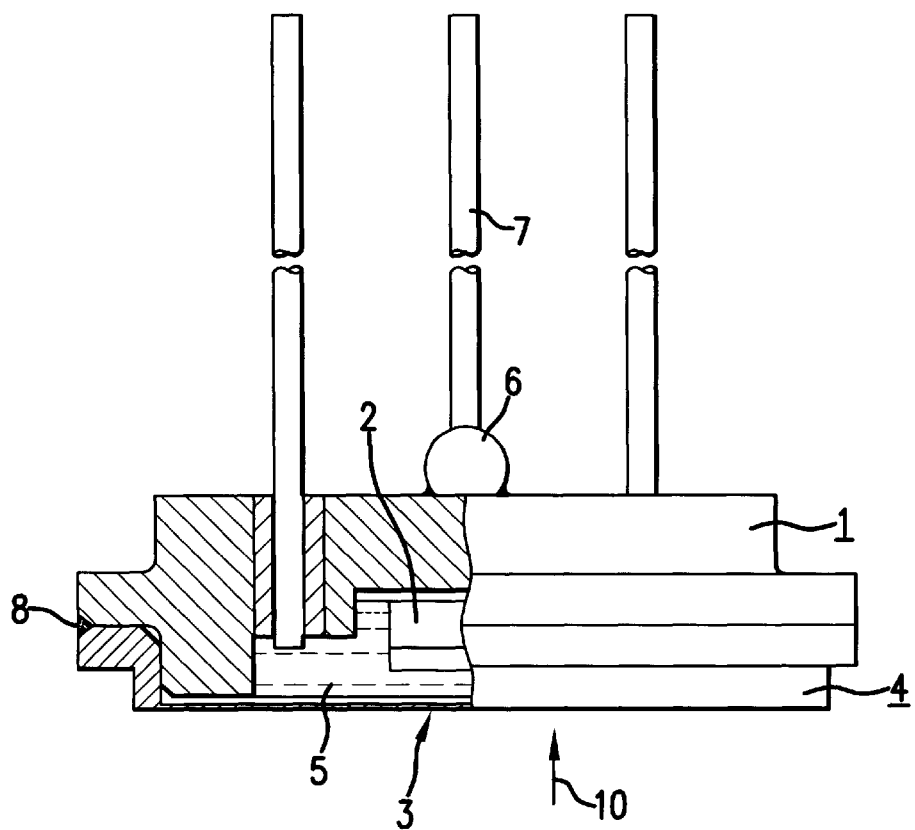
FIG. 11 is a vertical, sectional view showing an example of construction of another prior art pressure detector.
Figure 12:
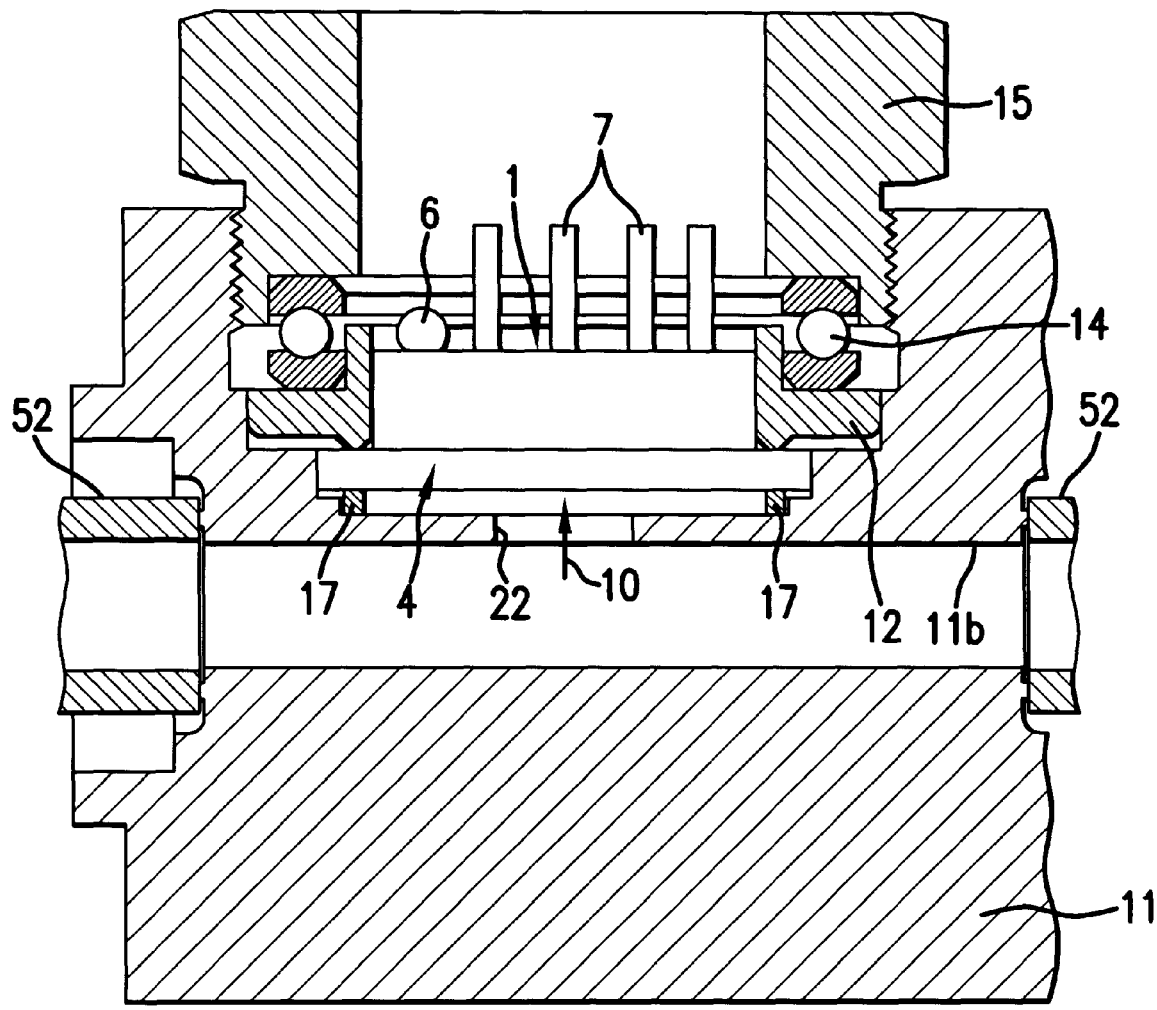
FIG. 12 is a vertical, sectional view showing the construction of mounting the prior art pressure detector in FIG. 10.
Figure 13:
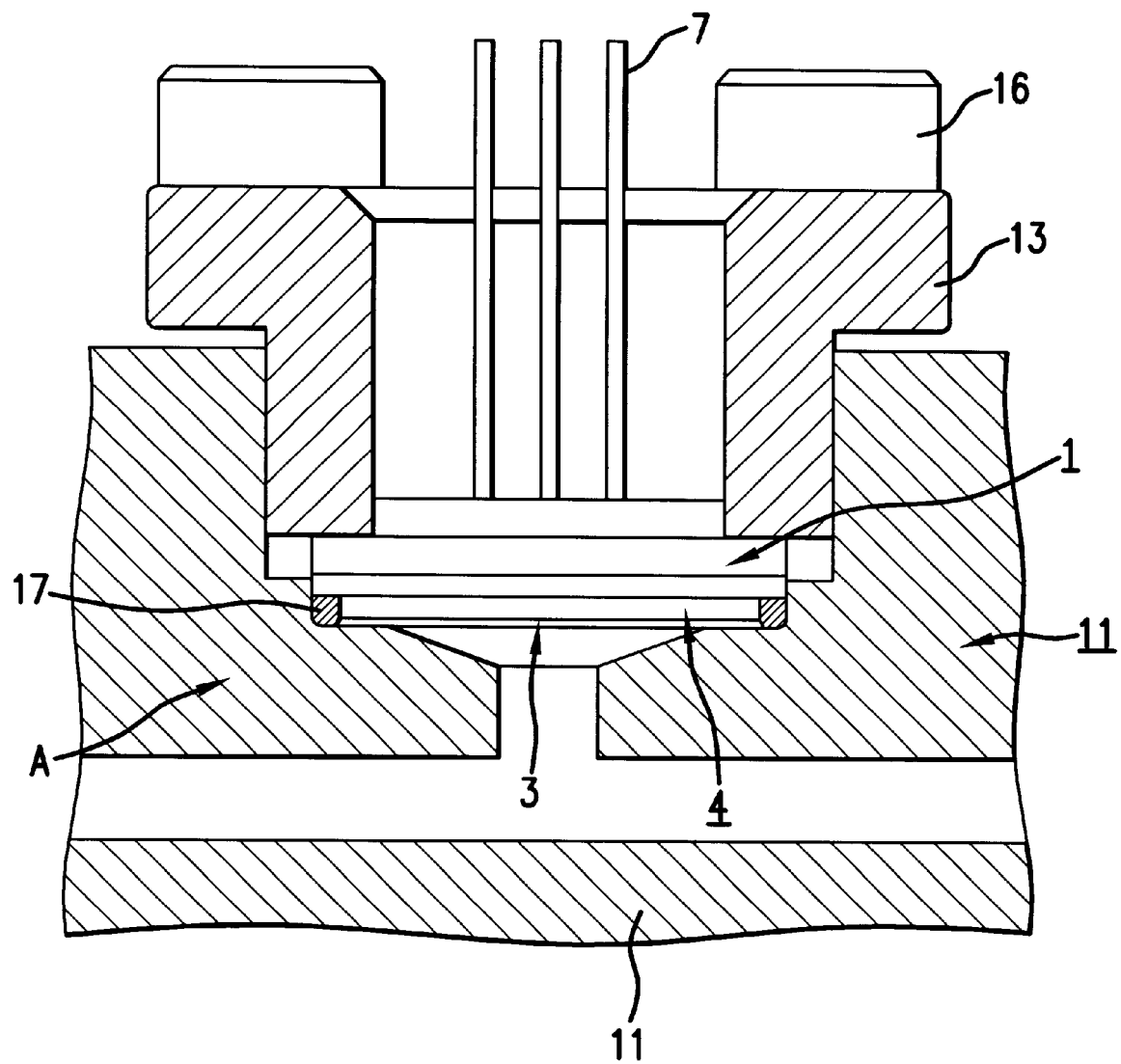
FIG. 13 is a vertical, sectional view showing the construction of mounting the prior art pressure detector in FIG. 11.
Figure 14:
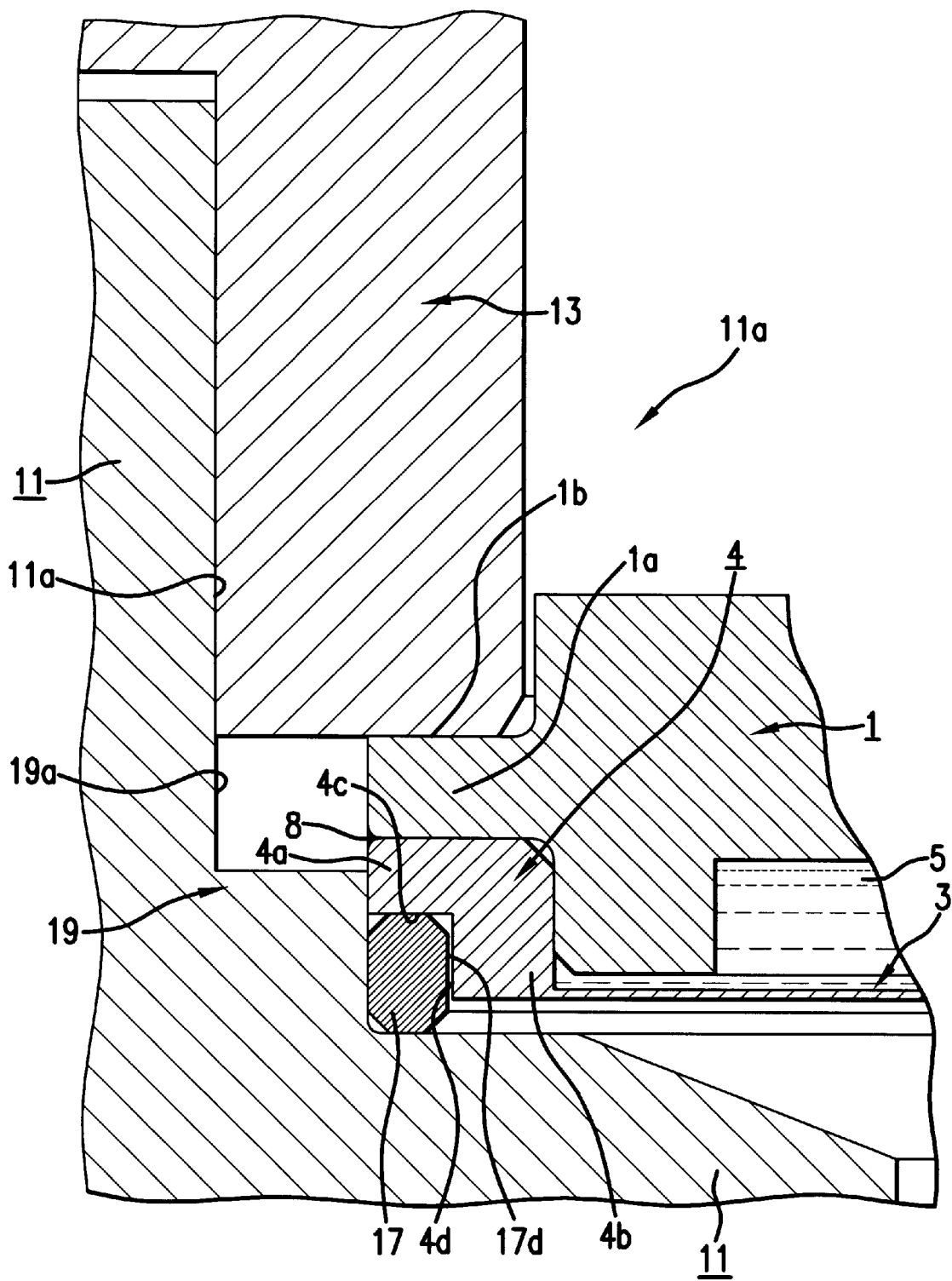
FIG. 14 is an enlarged sectional view of the area indicated by A in FIG. 13.

FIG. 8 is a schematic section view of a pressure detector according to the fifth embodiment and FIG. 9 is a partially enlarged sectional view showing the mounting construction for the pressure detector.

The structure and construction for mounting the pressure detector according to the fifth embodiment are basically identical with those of the third embodiment shown in FIGS. 6 and 7. However, in the fifth embodiment the outer circumferential portion 24 of the collar 1a of the sensor base 1 and the outer circumferential portion 25 of the diaphragm base 4, that is, the outer circumferential portions outward of the dotted lines in FIGS. 8 and 9, are hardened.

The outer circumferential portions of the sensor base 1 and the diaphragm base 4 are hardened to reduce the strain force caused in the radial direction by compressive forces applied upward and downward when the presser member 13 is tightened up. The shallow grooves 18e to 18f absorb the strain force, thereby further keeping down the strain on the diaphragm 3.

Needless to say, the formation of hardened portions 24, 25 is applicable to the pressure detector shown in FIGS. 4 and 5.

Test Results

Experiments were conducted with the pressure detectors and mounting constructions described above. In the first and second embodiments, the magnitude of change ΔVo in output before and after the mounting under a pressure Po=0 kgf/cm². abs was less than about ±2.0 mv, a decrease of some 30 to 35% from that of the prior art.

In the third embodiment, the magnitude of change ΔVo in output was less than about ±1.0 mv, a decrease of 60 to 70% from that of the prior art.

Similarly, in the fourth embodiment, the magnitude of change ΔVo in output was less than about ±1.0 mv.

With respect to the fifth embodiment, it was confirmed that the magnitude of change ΔVo output is further reduced from that of the fourth embodiment.

(Effects of the Invention)

In the first and second embodiments described above, the shallow groove 18b is formed at the inside portion of the lower surface of the block of the diaphragm base 4 (or shallow grooves 18a, 18b are formed symmetrically at the inside portions of the upper surface and the lower surface of the block of the diaphragm base 4) so that the strain force arising when the pressure detector is tightened and clamped by the presser member 12 may be absorbed by the shallow groove 18b (or shallow grooves 18a, 18b). Therefore, the stress or strain acting on the diaphragm 3 is further reduced, thereby substantially decreasing the magnitude of change in measurements before and after the tightening.

In the third embodiment, a plurality of step portions are defined in the lower portion of the mounting hole 11a of the mounting fixture main body of the pressure detector, and the diaphragm base of the pressure detector is formed of a collar and a thick block. The gasket 17 with an almost rectangular section is placed in a fitting portion formed with the circumferential wall surface and the flat surface of the second step portion and the collar lower surface of the diaphragm base. As a result, even if the sensor presser is inserted in the detector mounting hole, with the upper part of the collar of the sensor base pressed downward, the reaction force applied on the diaphragm base 4 through the presser member 13 is absorbed by the collar 4a of the diaphragm base 4 and the thick block 4b, so that little strain is caused by the reaction force on the diaphragm 3 formed integrally with the block 4b.

Such an advantage, together with the fact that the shallow grooves 18c–18d absorb the stress or strain as seen in the second embodiment, minimizes the fluctuations in output before and after the mounting of the pressure detector on the fixture main body and temperature characteristics even in the area where the fluid pressure is low, thus solving problems in practical use. This makes it possible to apply this kind of diaphragm type pressure detector to a pipe line and the like.

The fourth embodiment is so constituted that shallow grooves 18g, 18h are formed at places higher than the seal surface 4g of the diaphragm base 4. To the effects of the second embodiment, this adds the effects of absorbing strain or stress by the shallow grooves 18g, 18h, thereby further reducing fluctuations in output before and after mounting.

In the fifth embodiment, the portion on which the tightening force of the presser member 13 is applied is made of a hardened material, which reduces the material deformation by stress in tightening. This greatly reduces the strain on the diaphragm, which further keeps down the fluctuations in output.

What is claimed is:

1. A construction for mounting a pressure detector in a mounting hole of a fixture main body, the fixture main body being mountable in a pipe line and having a fluid passage for admitting a fluid pressure in the pipe line into said mounting hole, the pressure detector comprising a diaphragm base having a diaphragm and a sensor base fastened to the diaphragm base and having a sensor element that is activated with displacement of the diaphragm, a gasket disposed in said mounting hole between said fixture main body and a peripheral flange on said diaphragm base, and a presser member contacting an upper surface of the peripheral flange so that a portion of a lower surface of the peripheral flange contacts the gasket to form a fluid-tight seal, said peripheral flange having a shallow groove in the form of a ring in said lower surface at a place inward of the portion contacting the metal gasket so that strain on the diaphragm base arising from pressing by the presser member is absorbed by the shallow groove.

2. A construction for mounting a pressure detector in a mounting hole of a fixture main body, the fixture main body being mountable in a pipe line and having a fluid passage for admitting a fluid pressure in the pipe line into said mounting hole, the pressure detector comprising a diaphragm base having a diaphragm and a sensor base fastened to the diaphragm base and having a sensor element that is activated with displacement of the diaphragm, a gasket disposed in said mounting hole between said fixture main body and a peripheral flange on said diaphragm base, and a presser member contacting an upper surface of the peripheral flange so that a portion of a lower surface of the peripheral flange contacts the gasket to form a fluid-tight seal, said peripheral flange having a shallow groove in the form of a ring in said upper surface at a place inward of the portion contacting the presser member and a shallow groove in the form of a ring on said lower surface at a place inward of the portion contacting the metal gasket so that strain on the diaphragm base arising from pressing by the presser member is absorbed by the shallow grooves.

3. A construction for mounting a pressure detector in a mounting hole of a fixture main body, the fixture main body being mountable in a pipe line and having a fluid passage for admitting a fluid pressure in the pipe into said mounting hole, the pressure detector comprising a diaphragm base having a diaphragm and a sensor base fastened to the diaphragm base and having a sensor element that is activated with displacement of the diaphragm, the sensor base and the diaphragm base each having a collar, the collars being opposite each other and fixed together, a metal gasket of generally rectangular section, said fixture main body defining a first step portion and a second step portion, said gasket being disposed on said second step portion, a presser for contacting and pressing against a portion of an upper surface of the collar on the sensor base to thereby press a lower surface of the collar on the diaphragm base into contact with said gasket so that fluid-tight seals are provided between an upper surface of said gasket and the lower surface of the diaphragm collar and between a lower surface of said gasket and said second step portion, the upper surface of the collar on the sensor base having a shallow ring groove therein inward of the portion contacted by said presser, and the lower surface of the collar on the diaphragm base having a shallow ring groove inward of the portion of said lower surface in contact with the gasket, whereby strain arising from pressing on the upper surface of the collar on the sensor base by the presser is absorbed by the shallow grooves.

4. A construction for mounting a pressure detector in a mounting hole of a fixture main body, the fixture main body being mountable in a pipe line and having a fluid passage for admitting a fluid pressure in the pipe line into said mounting hole, the pressure detector comprising a diaphragm base having a diaphragm and a sensor base fastened to the diaphragm base and having a sensor element that is activated with displacement of the diaphragm, the sensor base having a collar overlaying a top surface of the diaphragm base, the diaphragm base and the sensor base being fixed together, a metal gasket of generally rectangular section, said fixture main body defining a first step portion and a second step portion, said gasket being disposed on said second step portion, said diaphragm base having a protruding portion extending toward said second step portion so as to form a seal surface contacting an upper surface of said gasket, and a presser for contacting and pressing on an upper surface portion of the collar on the sensor base so that said seal surface is pressed against said upper surface of said gasket, the upper surface of the collar on said sensor base having a shallow ring groove therein located inwardly of the surface portion contacted by said presser, the diaphragm base having a lower surface with a shallow ring groove therein at a position inward of the protruding portion, the protruding portion of the diaphragm base having inwardly and outwardly facing surface, the inwardly and outwardly facing surfaces each having a shallow groove therein, the shallow grooves in the inwardly and outwardly facing surfaces being opposite to each other, at the position upward of the seal surface protruding downward, whereby strain arising from pressing on the upper surface portion of the collar on the sensor base is absorbed by the shallow grooves.

5. A construction for mounting a pressure detector as defined in claim 3, wherein outer circumferential portions of the collars on the sensor base and diaphragm base are each made of a material with a high hardness.

6. A construction for mounting a pressure detector as defined in claim 4, wherein an outer circumferential portion of the collar on the sensor base and an outer circumferential portion of the diaphragm base are each made of a material with a high hardness.

* * * * *